(12) United States Patent
Zhang (10) Patent No.: US 10,928,715 B1
(45) Date of Patent: Feb. 23, 2021

(54) ROTARY IMAGE PROJECTOR

(71) Applicant: GEMMY INDUSTRIES CORPORATION, Coppell, TX (US)

(72) Inventor: Cheng-Chun Zhang, Shenzhen (CN)

(73) Assignee: GEMMY INDUSTRIES CORPORATION, Coppell, TX (US)

(*) Notice: Subject to any disclaimer, the term of this patent is extended or adjusted under 35 U.S.C. 154(b) by 0 days.

(21) Appl. No.: 16/997,097

(22) Filed: Aug. 19, 2020

(51) Int. Cl.
  *G03B 21/14* (2006.01)
  *G03B 21/00* (2006.01)
  *G03B 21/02* (2006.01)

(52) U.S. Cl.
  CPC ......... *G03B 21/145* (2013.01); *G03B 21/001* (2013.01); *G03B 21/02* (2013.01)

(58) Field of Classification Search
  CPC .... G03B 21/145; G03B 21/001; G03B 21/02; G03B 21/00; G03B 21/08; G03B 21/10; G03B 21/14
  USPC .......................................... 353/94, 108, 103
  See application file for complete search history.

(56) References Cited

U.S. PATENT DOCUMENTS

| | | | | |
|---|---|---|---|---|
| 10,126,637 B2* | 11/2018 | Sum | ........................ | G03B 21/10 |
| 10,509,304 B2* | 12/2019 | Chien | ..................... | G03B 29/00 |
| 2015/0131057 A1* | 5/2015 | Schenck | .............. | G03B 21/145 |
| | | | | 352/133 |
| 2016/0097969 A1* | 4/2016 | Sum | ........................ | A41G 1/005 |
| | | | | 353/15 |

* cited by examiner

*Primary Examiner* — William C. Dowling
(74) *Attorney, Agent, or Firm* — Rabin & Berdo, P.C.

(57) ABSTRACT

A rotary image projector includes a lamp shade, a power board, a driver, and a projection module. The power board is mounted to the lamp shade. The driver is disposed in the lamp shade and electrically connected to the power board. The projection module is driven to rotate by the driver and has a luminous element, a collective lens, and at least two projection assemblies. The luminous element is electrically connected to the power board. The collective lens is spaced apart from the luminous element. Each one of the at least two projection assemblies is disposed on one of two sides of the collective lens away from the luminous element and has a positioning sleeve, a film, and at least one imaging lens. The film is mounted to the positioning sleeve. The at least one imaging lens is mounted to the positioning sleeve.

14 Claims, 9 Drawing Sheets

FIG.9 too long formed between the supporting board 30 and the cover 13, is fixed on the supporting board 30, and is electrically connected to the power board 20. The driver 40 has a driving shaft 41 passing through the supporting board 30 and extending into the containing space 121 of the shield 12 via the space formed between the supporting board 30 and the cover 13. The power board 20 supplies the driver 40 with electrical power after connected to an external supply, such that the driving shaft 41 rotates relative to the driver 40.

Figure 1:
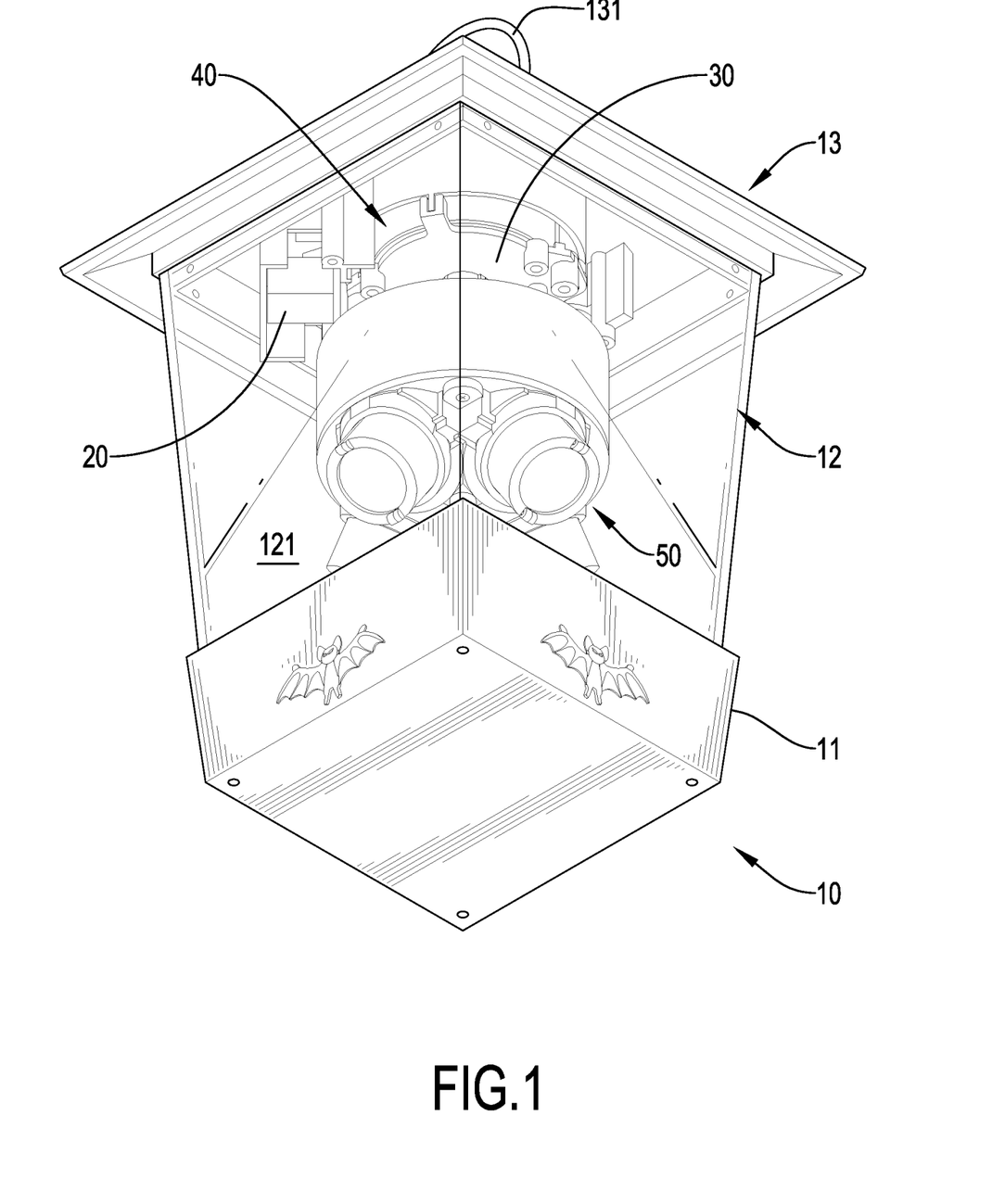
Figure 2:
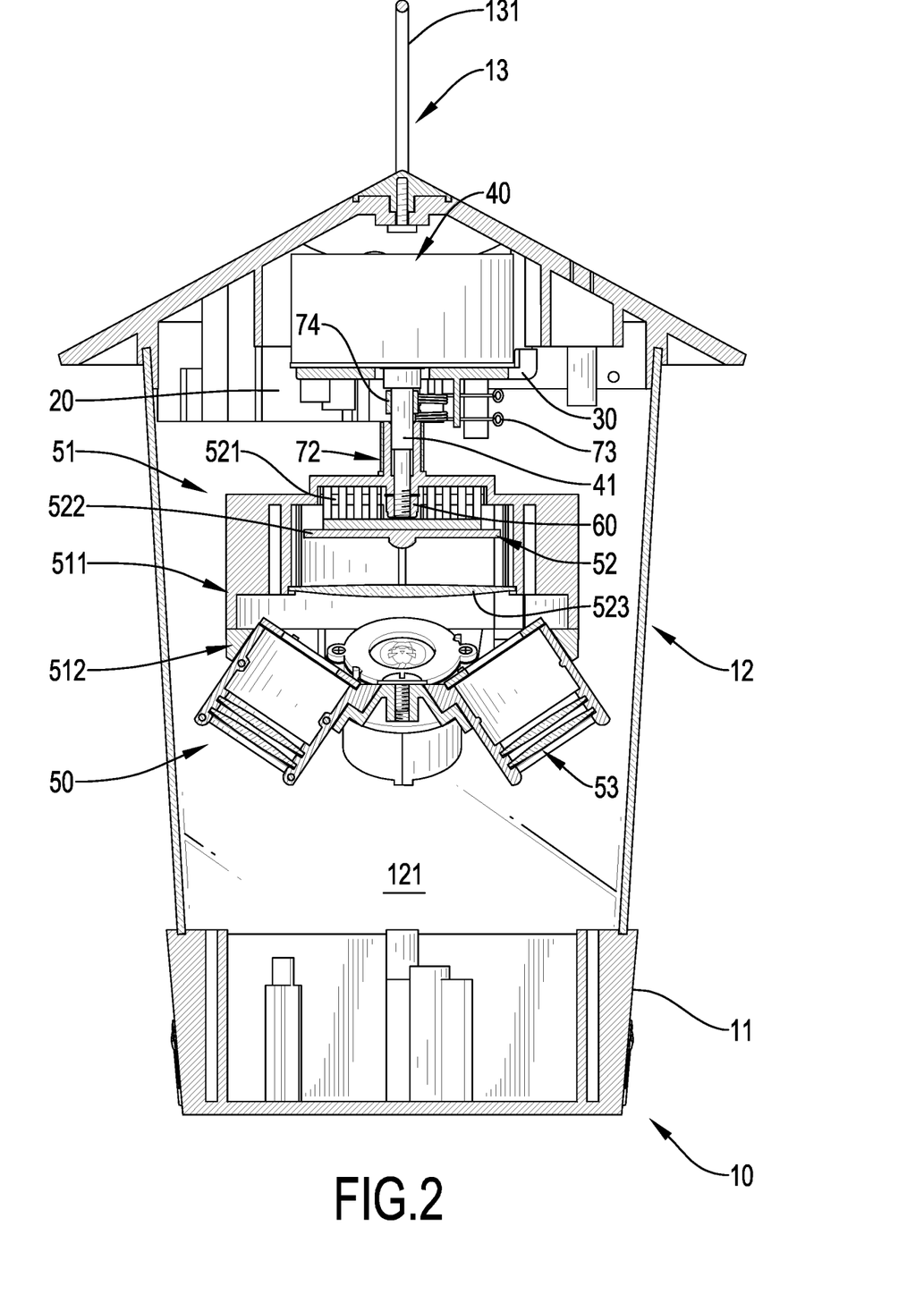
Figure 3:
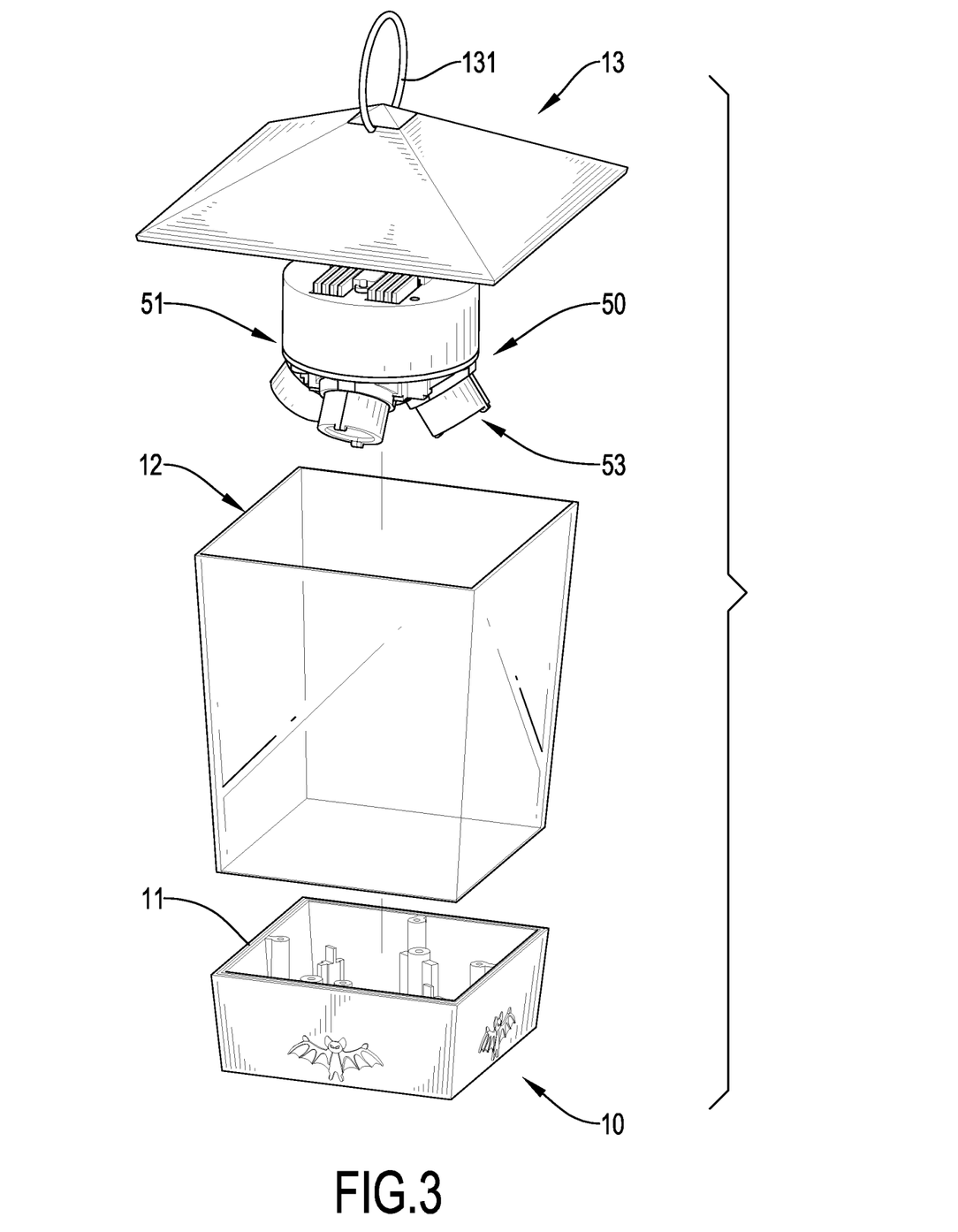
Figure 4:
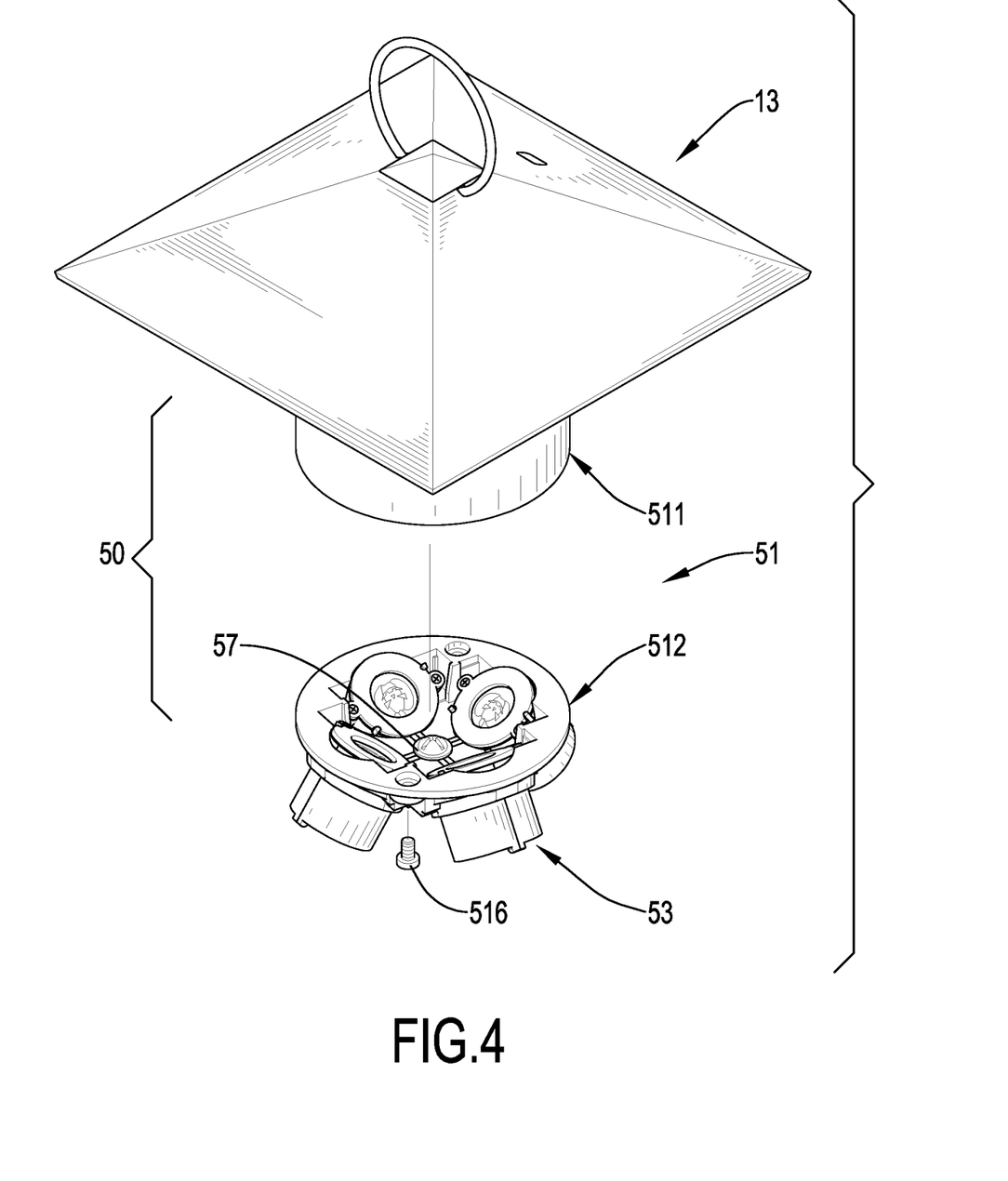
Figure 6:
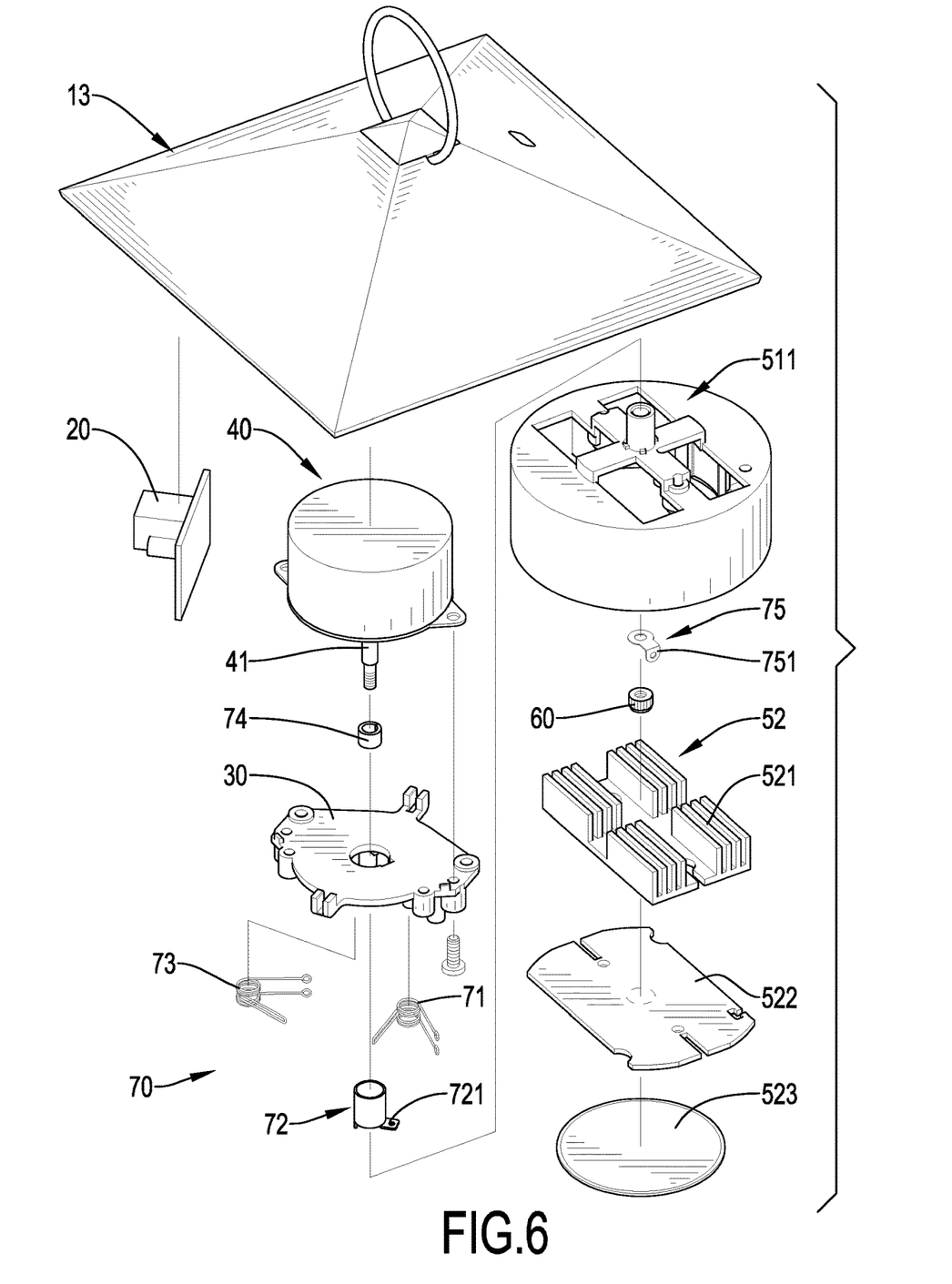

With reference to FIGS. 1 to 4, the projection module 50 is mounted to the driving shaft 41 of the driver 40, is disposed in the containing space 121 of the shield 12, is above the base 11, and is driven to rotate by the driver 40. The projection module 50 has a rotating base 51, a light-emitting assembly 52, at least two projection assemblies 53, and a pressing element 57. With reference to FIGS. 2, 4, and 6, the rotating base 51 is mounted to the driving shaft 41 of the driver 40, and has a first casing 511, a second casing 512, and at least one bolt 516. The first casing 511 sleeves the driving shaft 41 of the driver 40. The fixing element 60 is mounted to a portion of the driving shaft 41 extending into the first casing 511, and the first casing 511 abuts against the fixing element 60. In such an arrangement, the first casing 511 is supported by the fixing element 60, so the first casing 511 will not fall. In the present invention, the fixing element 60 is an anti-slip nut.

Figure 7:
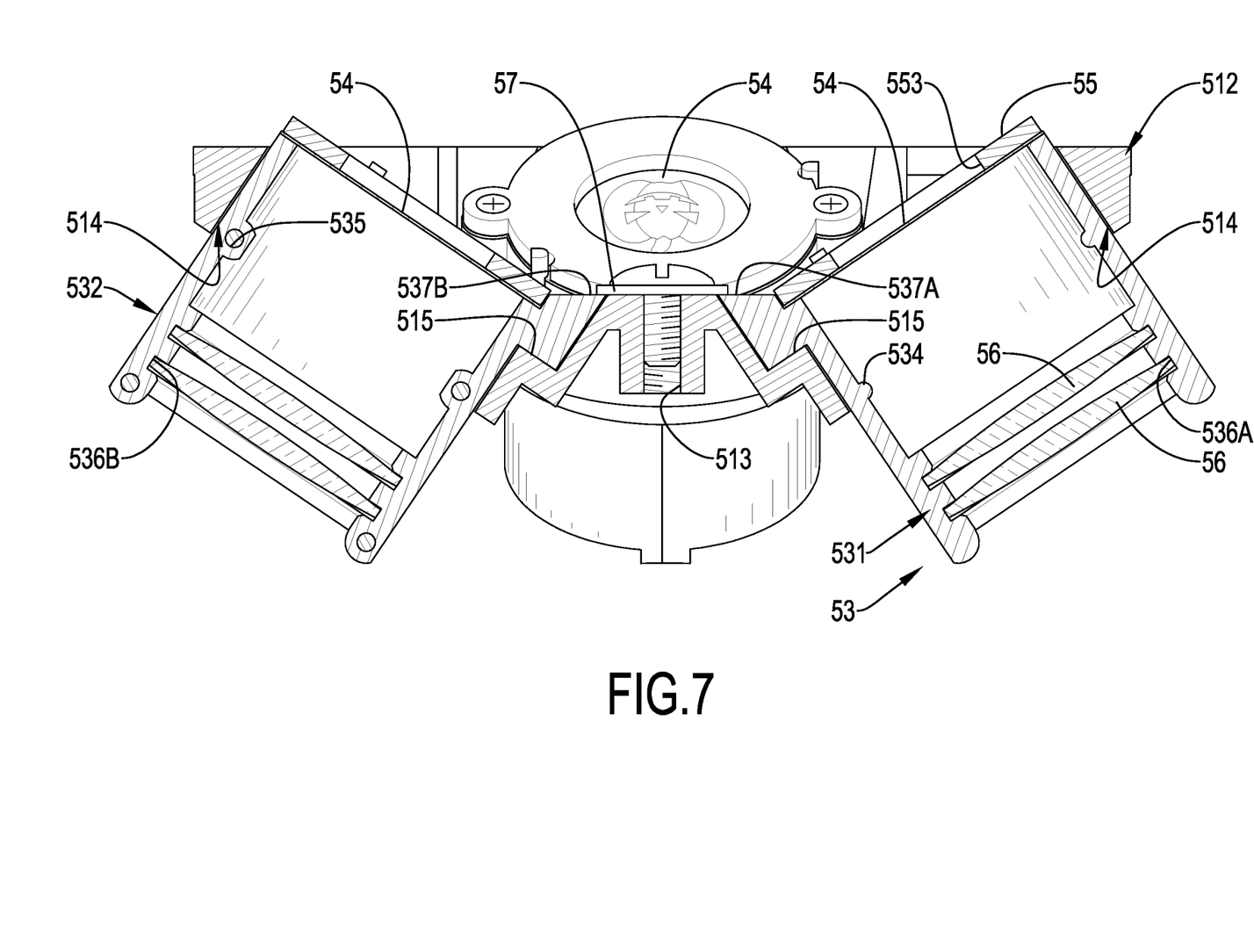
Figure 8:
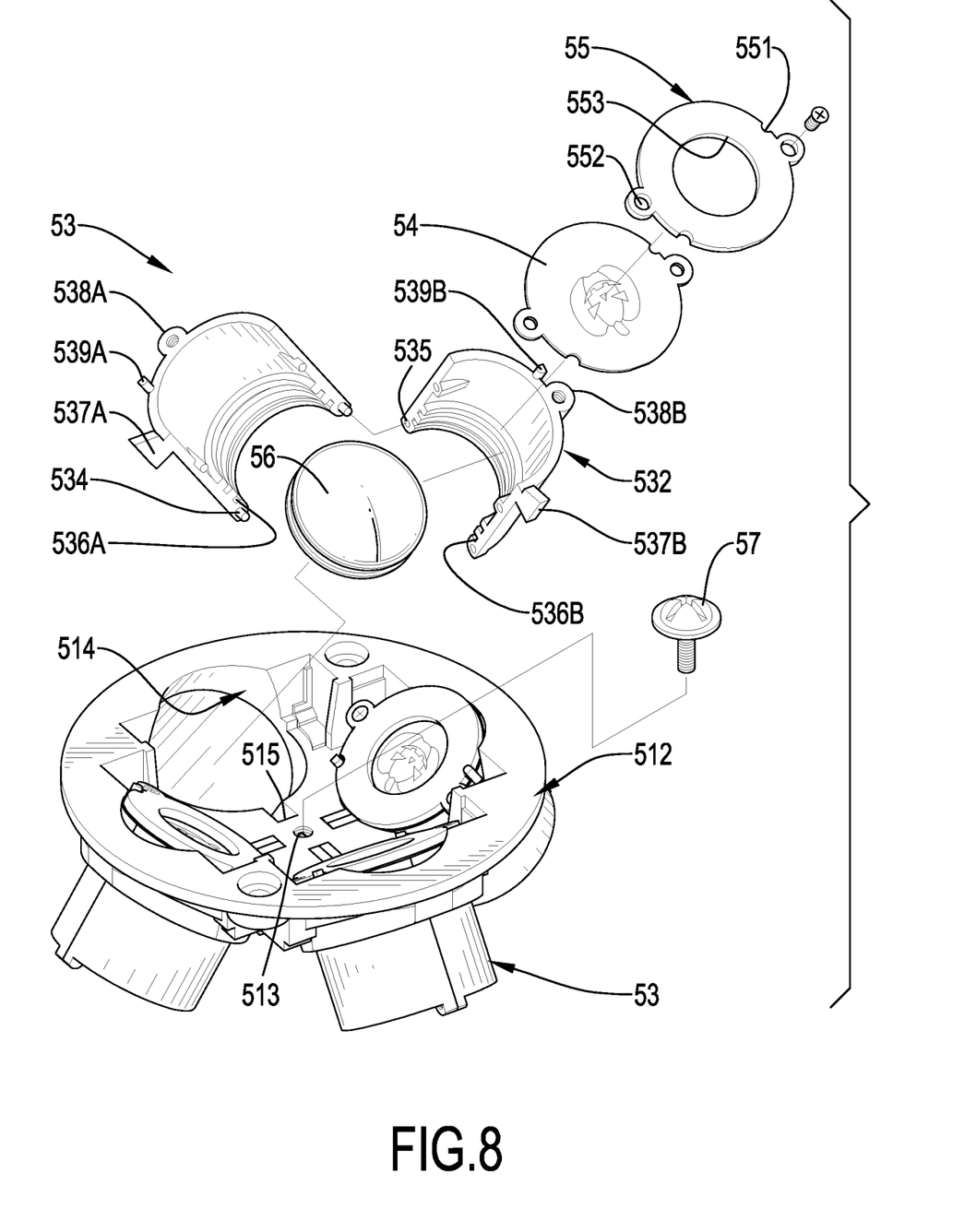

With reference to FIGS. 2, 7, and 8, the second casing 512 is mounted to one of two sides of the first casing 511 away from the driver 40, and has a mounting hole 513 and at least two containing grooves 514. With reference to FIG. 7, the mounting hole 513 is formed in the second casing 512. The at least two containing grooves 514 are formed on the second casing 512, are disposed at a spaced interval, and each one of the at least two containing grooves 514 has an engagement groove 515. The engagement groove 515 is formed on the corresponding containing groove 514 and is adjacent to the mounting hole 513. With reference to FIG. 4, the at least one bolt 516 extends through the second casing 512 and the first casing 511, such that the first casing 511 and the second casing 512 are assembled together to form the rotating base 51.

With reference to FIGS. 2 and 6, the light-emitting assembly 52 is mounted within the first casing 511 of the rotating base 51, and has a heat radiating plate 521, a luminous element 522, and a collective lens 523. The heat radiating plate 521 is disposed within the first casing 511, and the heat radiating plate 521 partially extends out of a top surface of the first casing 511. The luminous element 522 is disposed within the first casing 511, is electrically connected to the power board 20, and abuts against the heat radiating plate 521. The power board 20 supplies the luminous element 522 with electrical power to enable the luminous element 522 to illuminate after the power board 20 is connected to an external supply. Furthermore, the luminous element 522 is an LED (Light-emitting diode; LED) light board. The collective lens 523 is disposed within the first casing 511, is disposed on one of two sides of the luminous element 522 away from the heat radiating plate 521, and is spaced apart from the luminous element 522. Light emitted by the luminous element 522 is refracted into several beams traveling near one another after travelling through the collective lens 523.

With reference to FIGS. 2, 7, and 8, each one of the at least two projection assemblies 53 is mounted in a respective one of the at least two containing grooves 514 of the second casing 512, such that the at least two projection assemblies 53 are disposed on one of two sides of the collective lens 523 away from the luminous element 522. The at least two projection assemblies 53 are spaced apart from each other, and each one of the at least two projection assemblies 53 has a positioning sleeve, a film 54, a pressing plate 55, and at least one imaging lens 56. The positioning sleeve is disposed on one of the two sides of the collective lens 523 away from the luminous element 522, is mounted in the corresponding containing groove 514 of the second casing 512, and has a first half cylinder 531 and a second half cylinder 532.

The first half cylinder 531 has multiple studs 534, at least one positioning groove 536A, an engagement block 537A, a mounting portion 538A, and a positioning rod 539A. The multiple studs 534 protrude on one of two sides of the first half cylinder 531 facing the second half cylinder 532 at spaced intervals. The at least one positioning groove 536A is formed on an inner surface of the first half cylinder 531. The engagement block 537A protrudes on an outer surface of the first half cylinder 531, and the contour of the engagement block 537A corresponds to the contour of the engagement groove 515 of the corresponding containing groove 514, such that the engagement block 537A engages in the engagement groove 515. The mounting portion 538A protrudes on the outer surface of the first half cylinder 531, and is spaced apart from the engagement block 537A. The positioning rod 539A protrudes on a top surface of the first half cylinder 531.

With reference to FIGS. 7 and 8, the second half cylinder 532 has multiple receiving grooves 535, at least one positioning groove 536B, a positioning rod 539B, an engagement block 537B, and a mounting portion 538B. The multiple receiving grooves 535 are formed on one of two sides of the second half cylinder 532 facing the first half cylinder 531, and each one of the multiple receiving grooves 535 corresponds to a respective one of the multiple studs 534 and receives the corresponding stud 534. The first half cylinder 531 and the second half cylinder 532 are assembled to form the positioning sleeve via the connection of each one of the multiple studs 534 with the corresponding receiving groove 535. The at least one positioning groove 536B is formed on an inner surface of the second half cylinder 532 and aligns with the at least one positioning groove 536A of the first half cylinder 531.

After the first half cylinder 531 and the second half cylinder 532 are assembled, the at least one positioning groove 536A and the at least one positioning groove 536B form an annular groove together. The positioning rod 539B protrudes on a top surface of the second half cylinder 532. The engagement block 537B and the mounting portion 538B protrude on an outer surface of the second half cylinder 532. The positions where the engagement block 537B and the mounting portion 538B are located are symmetrical to the positions where the engagement block 537A and the mounting portion 538A are located. The engagement blocks 537A, 537B form an engagement assembly protruding on an outer surface of the positioning sleeve together, and the engagement assembly engages in the engagement groove 515 of the corresponding containing groove 514.

With reference to FIGS. 7 and 8, the film 54 is mounted on one of two ends of the positioning sleeve adjacent to the engagement blocks 537A, 537B, and the film 54 has a pattern disposed thereon. The pressing plate 55 is disposed on the film 54 and has two concave portions 551, two through holes 552, and a light passing hole 553. The two concave portions 551 are formed on the pressing plate 55 at a spaced interval, and each one of the two concave portions 551 either aligns with the positioning rod 539A of the first half cylinder 531 or the positioning rod 539B of the second half cylinder 532. Each one of the two through holes 552 is disposed through the pressing plate 55 and either aligns with the mounting portion 538A of the first half cylinder 531 or the mounting portion 538B of the second half cylinder 532. The light passing hole 553 is formed through the pressing plate 55, and the two concave portions 551 and the two through holes 552 all surround the light passing hole 553.

To position the film 54 on the positioning sleeve, make the two positioning rods 539A, 539B pass through the two concave portions 551. Next, insert two fixing bolts into the two through holes 552 of the pressing plate 55, the film 54, and the two mounting portions 538A, 538B of the positioning sleeve. In such an arrangement, the pressing plate 55 can be mounted on the positioning sleeve, and the film 54 can be positioned between the positioning sleeve and the pressing plate 55 so as to be mounted on the positioning sleeve.

With reference to FIGS. 2, 7, and 8, the at least one imaging lens 56 is mounted within the annular groove formed by the at least one positioning groove 536A and the at least one positioning groove 536B and is disposed on one of two sides of the film 54 away from the luminous element 522. In such a configuration, the light travelling through the collective lens 523 in turn travels through the film 54 and the at least one imaging lens 56 to form an image corresponding to the pattern on the film 54.

With reference to FIGS. 7 and 8, the pressing element 57 is mounted to the mounting hole 513 of the second casing 512 to press the engagement blocks 537A, 537B of the positioning sleeve of each one of the at least two projection assemblies 53 into the engagement groove 515 of the corresponding containing groove 514. Therefore, each one of the at least two projection assemblies 53 can be positioned in the second casing 512.

With reference to FIGS. 7 and 8, in the present invention, the first half cylinder 531 of each one of the at least two projection assemblies 53 has two said positioning grooves 536A spaced apart from each other. The second half cylinder 532 has two said positioning grooves 536B, and each one of the two positioning grooves 536B aligns with a respective one of the two positioning grooves 536A of the first half cylinder 531 to form two said annular grooves. Each one of the at least two projection assemblies 53 has two said imaging lenses 56, and the two imaging lenses 56 are respectively mounted within the two annular grooves and are spaced apart from each other. The imaging lens 56 disposed away from the film 54 magnifies an image formed via the imaging lens 56 disposed adjacent to the film 54. The second casing 512 has four said containing grooves 514. The projection module 50 has four said projection assemblies 53, and each one of the four projection assemblies 53 is mounted in a respective one of the four containing grooves 514.

Figure 5:
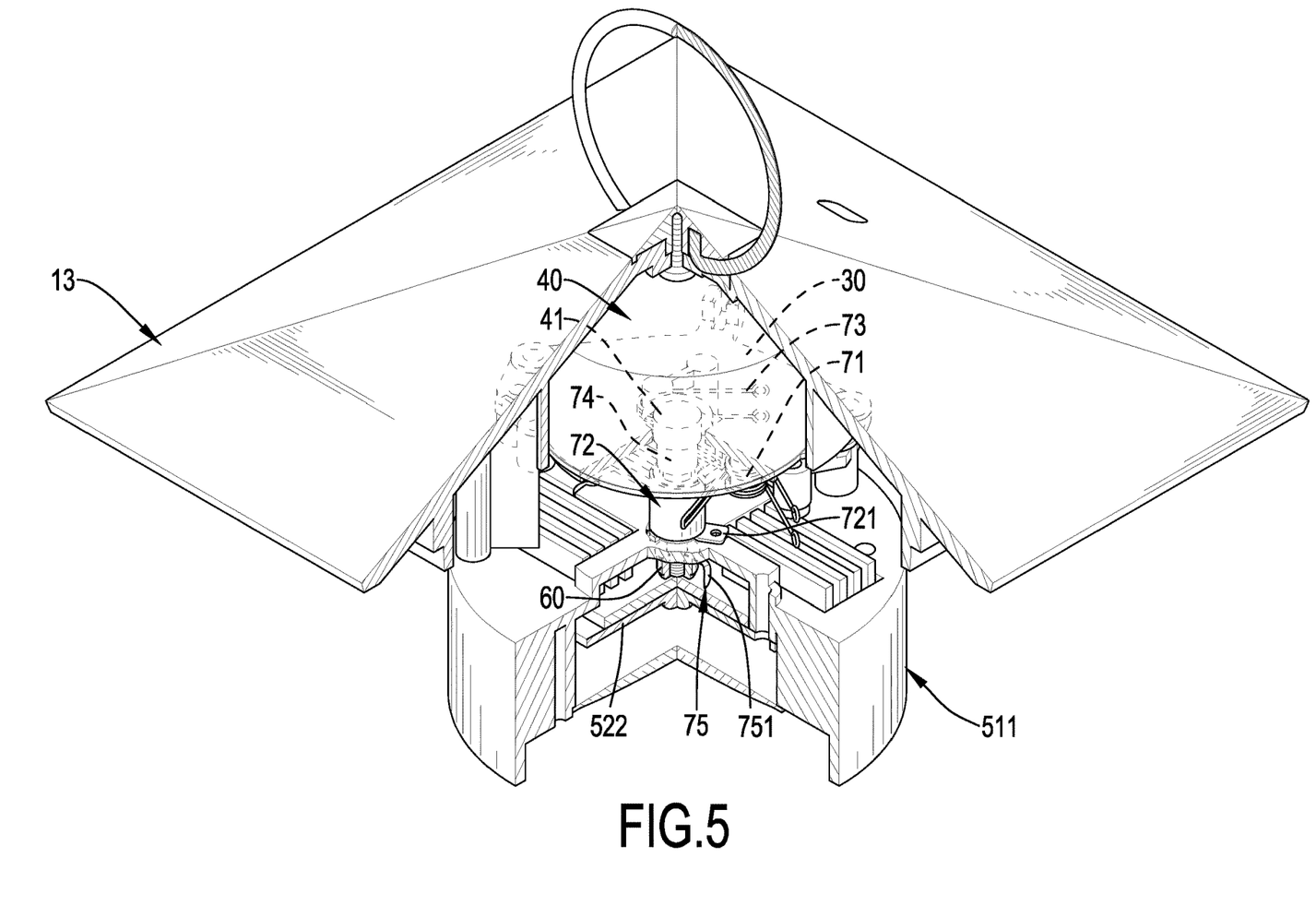

With reference to FIGS. 2, 5, and 6, the electrical connection module 70 has a first torsion spring 71, a first conductive sleeve 72, a second torsion spring 73, a second conductive sleeve 74, and a conductive piece 75. The first torsion spring 71 is mounted on the supporting board 30, and one of two ends of the first torsion spring 71 is electrically connected to a positive terminal of the power board 20 via a wire. The first conductive sleeve 72 sleeves a portion of the first casing 511 that sleeves the driving shaft 41 of the driver 40, surrounds the driving shaft 41, and has a first connection portion 721. The other one of the two ends of the first torsion spring 71 abuts against the first conductive sleeve 72. The first connection portion 721 is electrically connected to a positive contact of the luminous element 522 via a wire. The second torsion spring 73 is mounted on the supporting board 30, is spaced apart from the first torsion spring 71, and one of two ends of the second torsion spring 73 is electrically connected to a negative terminal of the power board 20 via a wire.

The second conductive sleeve 74 sleeves the driving shaft 41 and is above the first conductive sleeve 72. One of the two ends of the second torsion spring 73 abuts against the second conductive sleeve 74. The conductive piece 75 sleeves the driving shaft 41, is disposed between the first casing 511 and the fixing element 60, and has a second connection portion 751. The second connection portion 751 is electrically connected to a negative contact of the luminous element 522 via a wire. The power board 20, the first torsion spring 71, the first conductive sleeve 72, the luminous element 522, the conductive piece 75, the driving shaft 41, the second conductive sleeve 74, and the second torsion spring 73 form a closed loop, such that an electric current flows in the closed loop. In such a configuration, the electric current flows through the luminous element 522 in a manner that the wires will not be twisted while the projection module 50 is driven to rotate by the driver 40.

In the present invention, the first torsion spring 71 and the second torsion spring 73 are conductive and elastic, so the first torsion spring 71 abuts against the first conductive sleeve 72 tightly and the second torsion spring 73 abuts against the second conductive sleeve 74 tightly during the rotation of the driving shaft 41. Hence, poor contacts between the first torsion spring 71 and the first conductive sleeve 72 and between the second torsion spring 73 and the second conductive sleeve 74 are avoided.

Figure 9:
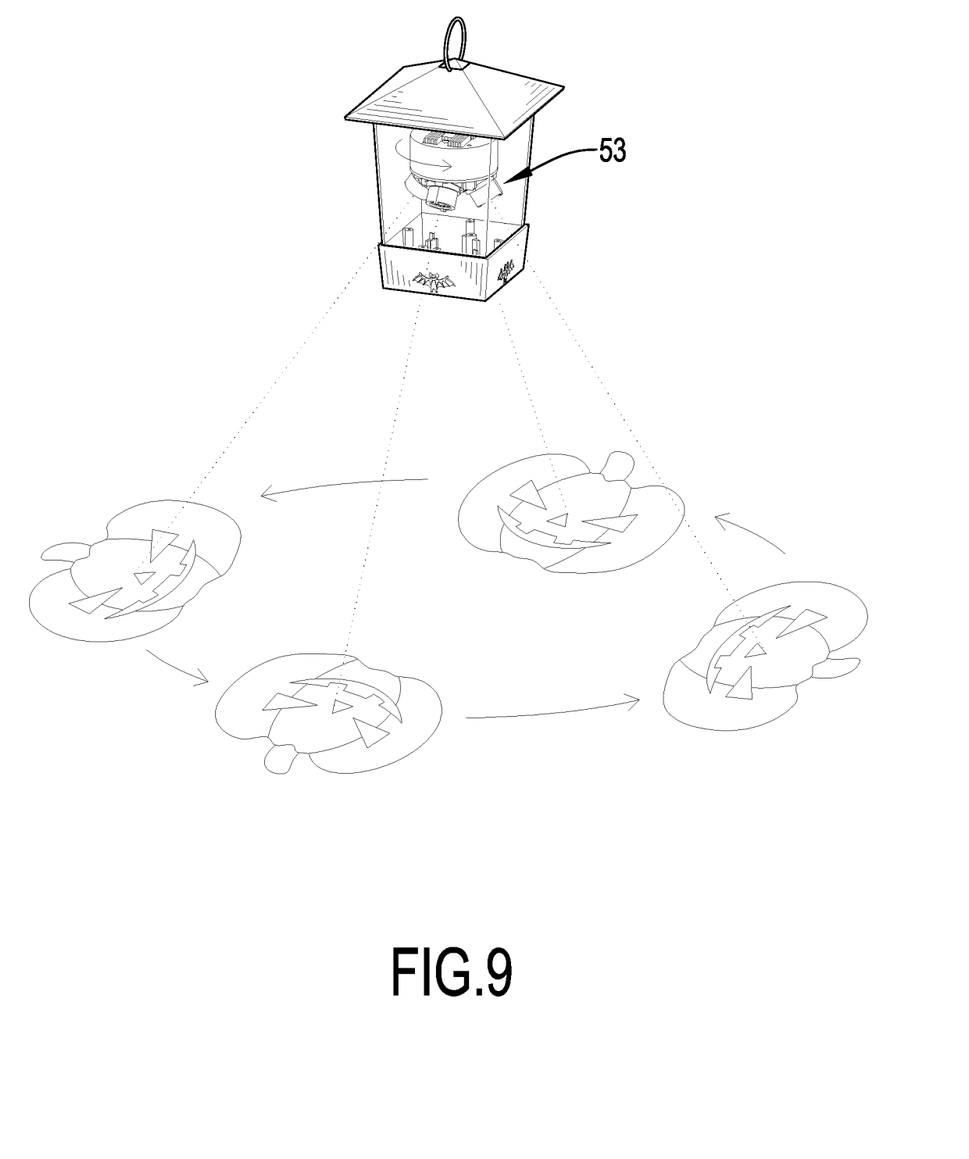

With reference to FIGS. 2, 7, and 9, when in use, connect the power board 20 with the external supply, and then the driver 40 and the luminous element 522 of the light-emitting assembly 52 are supplied with electrical power. Supplied with electrical power and mounted with the projection module 50, the driving shaft 41 is driven to rotate by the driver 40 and drives the projection module 50 to rotate along. Simultaneously, the light emitted by the luminous element 522 is refracted into several beams traveling near one another after travelling through the collective lens 523, and then the several beams of light pass through the light passing hole 553 of the pressing plate 55 of each one of the at least two projection assemblies 53 and travel through the film 54 and the two imaging lenses 56 to form an image corresponding to the pattern on the film 54. Since the shield 12 is transparent, the several beams of light travel through the shield 12, and the image formed by a corresponding one of the at least two projection assemblies 53 will be projected on a position such as a wall or a floor out of the lamp shade 10. The projection module 50 keeps rotating as the pattern on the film 54 of each one of the at least two projection assemblies 53 is projected, so the images projected keep rotating about a center as shown in FIG. 9.

A user can change the color of the light emitted by the luminous element 522 and the pattern on the film 54 of each one of the at least two projection assemblies 53 according to practical needs. Moreover, the pattern on the film 54 of one of the at least two projection assemblies 53 can be different from the pattern on the film 54 of the other one of the at least two projection assemblies 53. In this way, different projecting effects can be achieved by the present invention. The present invention can also be utilized as an insert ground stage light, a hanging projector lamp, a handheld projector lamp, or a street lamp.

With the aforementioned technical characteristics of the present invention, the rotary image projector has the following advantages.

Since the projection module 50 is mounted to the driving shaft 41 of the driver 40, the driving shaft 41 drives the projection module 50 to rotate when in use. During the rotation, the light-emitting assembly 52 in the projection module 50 rotates along with the film 54 and the at least one imaging lens 56 of each one of the at least two projection assemblies 53. In such a configuration, the images formed by the at least two projection assemblies 53 rotate about the center on a floor or a wall as shown in FIG. 9.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A rotary image projector comprising:
   a lamp shade;
   a power board mounted to the lamp shade;
   a driver disposed in the lamp shade, electrically connected to the power board, and having
      a driving shaft; and
   a projection module mounted to the driving shaft of the driver, driven to rotate by the driver, and having
      a luminous element electrically connected to the power board;
      a collective lens spaced apart from the luminous element; and
      at least two projection assemblies disposed on one of two sides of the collective lens away from the luminous element, spaced apart from each other, and each one of the at least two projection assemblies having
         a positioning sleeve disposed on one of the two sides of the collective lens away from the luminous element;
         a film mounted to the positioning sleeve; and
         at least one imaging lens mounted to the positioning sleeve and disposed on one of two sides of the film away from the luminous element;
   wherein light emitted by the luminous element travels through the film and the at least one imaging lens of each one of the at least two projection assemblies to form an image, and the images formed rotate about a center since the at least two projection assemblies are driven to rotate by the driver.

2. The rotary image projector as claimed in claim 1, wherein each one of the at least two projection assemblies has two said imaging lenses spaced apart from each other and disposed on one of the two sides of the film away from the luminous element.

3. The rotary image projector as claimed in claim 1, wherein
   the projection module has a rotating base having
      at least two containing grooves formed therein at a spaced interval; and
   the positioning sleeve of each one of the at least two projection assemblies is mounted in a respective one of the at least two containing grooves of the rotating base.

4. The rotary image projector as claimed in claim 2, wherein
   the projection module has a rotating base having
      at least two containing grooves formed therein at a spaced interval; and
   the positioning sleeve of each one of the at least two projection assemblies is mounted in a respective one of the at least two containing grooves of the rotating base.

5. The rotary image projector as claimed in claim 3, wherein
   each one of the at least two containing grooves has an engagement groove formed thereon; and
   the positioning sleeve of each one of the at least two projection assemblies has an engagement assembly protruding on an outer surface of the positioning sleeve and engaging in the engagement groove of a respective one of the at least two containing grooves.

6. The rotary image projector as claimed in claim 4, wherein
   each one of the at least two containing grooves has an engagement groove formed thereon; and
   the positioning sleeve of each one of the at least two projection assemblies has an engagement assembly protruding on an outer surface of the positioning sleeve and engaging in the engagement groove of a respective one of the at least two containing grooves.

7. The rotary image projector as claimed in claim 5, wherein
   the rotating base has a mounting hole formed therein;
   the engagement groove of each one of the at least two containing grooves is adjacent to the mounting hole; and
   the projection module has a pressing element mounted to the mounting hole to press the engagement assembly of the positioning sleeve of each one of the at least two projection assemblies into the engagement groove of the corresponding containing groove.

8. The rotary image projector as claimed in claim 6, wherein
   the rotating base has a mounting hole formed therein;
   the engagement groove of each one of the at least two containing grooves is adjacent to the mounting hole; and
   the projection module has a pressing element mounted to the mounting hole to press the engagement assembly of the positioning sleeve of each one of the at least two projection assemblies into the engagement groove of the corresponding containing groove.

9. The rotary image projector as claimed in claim 3, wherein
   each one of the at least two projection assemblies has a pressing plate mounted on the positioning sleeve; and
   the film is positioned between the positioning sleeve and the pressing plate so as to be mounted on the positioning sleeve.

10. The rotary image projector as claimed in claim 4, wherein
    each one of the at least two projection assemblies has a pressing plate mounted on the positioning sleeve; and
    the film is positioned between the positioning sleeve and the pressing plate so as to be mounted on the positioning sleeve.

11. The rotary image projector as claimed in claim 3, wherein
    the positioning sleeve of each one of the at least two projection assemblies has a first half cylinder and a second half cylinder assembled to form the positioning sleeve; and
    the at least one imaging lens is mounted between the first half cylinder and the second half cylinder.

12. The rotary image projector as claimed in claim 4, wherein the positioning sleeve of each one of the at least two projection assemblies has a first half cylinder and a second half cylinder assembled to form the positioning sleeve; and the at least one imaging lens is mounted between the first half cylinder and the second half cylinder.

13. The rotary image projector as claimed in claim 1, wherein the lamp shade has a hanging ring mounted at a top of the lamp shade.

14. The rotary image projector as claimed in claim 2, wherein the lamp shade has a hanging ring mounted at a top of the lamp shade.

* * * * *